United States Patent [19]
Alexander, Jr.

[11] 3,764,259
[45] Oct. 9, 1973

[54] GAS TREATING APPARATUS
[75] Inventor: Frank A. Alexander, Jr., West Boylston, Mass.
[73] Assignee: Morgan Construction Company, Worcester, Mass.
[22] Filed: June 16, 1972
[21] Appl. No.: 263,402

Related U.S. Application Data
[63] Continuation-in-part of Ser. No. 220,131, Jan. 24, 1972.

[52] U.S. Cl. ............................................. 432/180
[51] Int. Cl. ........................................... F27d 17/00
[58] Field of Search .................... 432/165, 178, 179, 432/180, 187

[56] References Cited
UNITED STATES PATENTS
1,905,677    4/1933   Billiar ............................... 432/179

Primary Examiner—John J. Camby
Attorney—C. Yardley Chittick et al.

[57] ABSTRACT

For use with a regenerative furnace, an apparatus for heating an incoming flow of combustion air while simultaneously cooling the waste gases being discharged from the furnace prior to directing the same to a gas cleaning device. The apparatus includes a regenerative heat exchanger (hereafter referred to as "regenerator") connected in series with a recuperative heat exchanger (hereafter called a "recuperator") between the furnace and the gas cleaning device. Incoming combustion air is directed initially through the recuperator and then through one of the chambers of the regenerator before being admitted to the furnace. Waste gases are passed through the other chamber of the regenerator and then through the recuperator before being directed to the gas cleaning device. The apparatus further includes a valve mechanism for simultaneously reversing the flow of waste gases and combustion air through the chambers of the regenerator.

6 Claims, 1 Drawing Figure

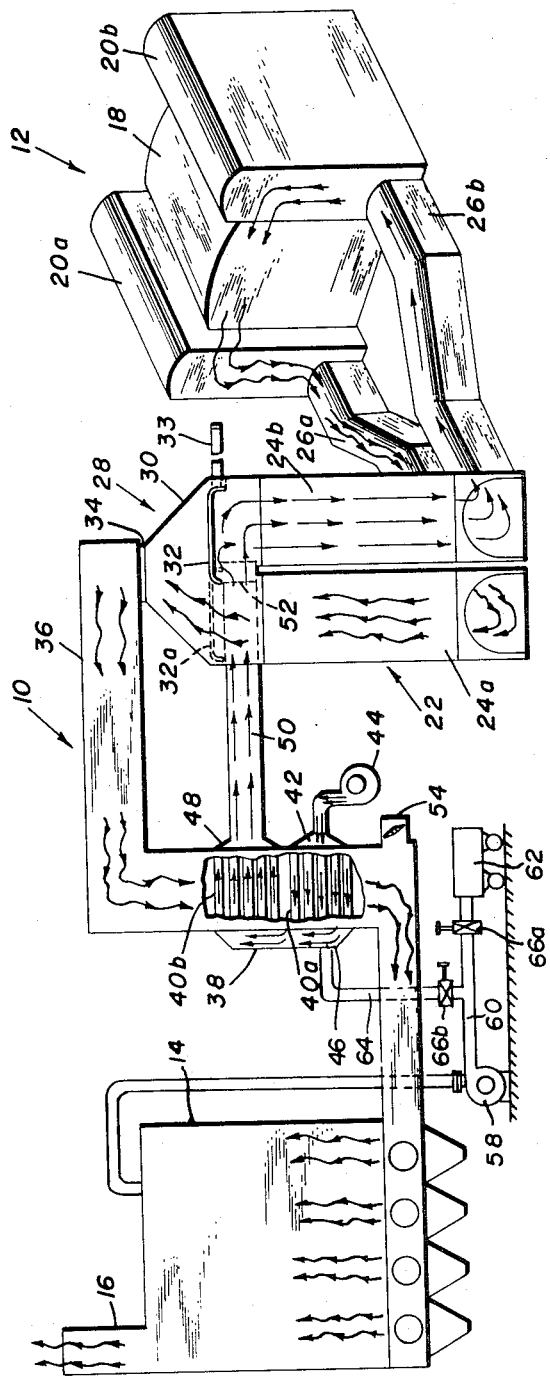

GAS TREATING APPARATUS

This application is a continuation-in-part of U.S. Patent Application Ser. No. 220,131 filed on Jan. 24, 1972.

DESCRIPTION OF THE INVENTION

This invention relates generally to regenerative furnaces and more particularly to an improved apparatus for handling both the incoming flow of combustion air and the outgoing flow of waste gases. The invention is especially useful with, although not restricted to, glass melting furnaces, steel soaking pits, open hearth furnaces and aluminum and copper remelting furnaces.

One of the principal objects of the present invention is to provide a unique and improved apparatus for achieving a more efficient transfer of heat from the waste gases being expelled from a regenerative furnace and the fresh combustion air being admitted into the furnace.

Another object of the present invention is the provision of an improved apparatus for achieving a greater reduction in the temperature of waste gases being expelled from a regenerative furnace prior to directing the gases to a cleaning device. A further and related object of the present invention is to provide as a direct result of the aforementioned reduction in the temperature of the waste gases, a substantial increase in the temperature of the combustion air being admitted to the furnace. Still another object of the present invention is the provision of means for substantially minimizing temperature variations in the waste gases being directed from a recuperative furnace to a gas cleaning device.

Broadly stated, the present invention includes the arrangement of a regenerator in series with a recuperator between a regenerative furnace and a gas cleaning device. Before being admitted to the furnace, the incoming combustion air is directed initially through the recuperator and then through one of the chambers of the regenerator. Simultaneously, waste gases from the furnace pass through the other chamber of the regenerator and then on through the recuperator before finally passing through the gas cleaning device and the chimney. A reversing valve is operated periodically to reverse the flow of combustion air and waste gases passing through the chambers of the regenerator.

An important feature of the invention, as broadly described above, resides in the combination in series of a regenerator and a recuperator. This arrangement provides two stage heating of the combustion air prior to directing the same to the furnace. The first stage takes place as the air passes through the tubes of the recuperator. These tubes are located in the path of the exiting waste gases at a point downstream from the regenerator. This first heating stage which is accomplished primarily by convection is followed by a second heating stage as the air then passes through one of the chambers of the regenerator. Since the regenerator has the capability of withstanding much higher waste gas temperatures, and since the combustion air has already been pre-heated at the recuperator, this second heating stage is characterized by a highly efficient radiational heat transfer which imparts a high temperature to the air flowing to the furnace. By heating the combustion air to a higher temperature, combustion efficiency at the furnace chamber can be markedly improved.

The two-stage heating of the combustion air is accompanied by a two-stage cooling of the waste gases flowing from the furnace to the gas cleaning equipment. The first cooling stage takes place as the waste gases pass through the regenerator, or regenerators, as the case may be, and the second cooling stage takes place as the waste gases pass through the recuperator. Several important advantages are derived from this arrangement. More particularly, where the waste gases contain volatile contaminators, as is often the case in the glass industry, most of the volatile matter is condensed from the waste gas stream in the regenerators, or flues associated therewith, where the gas passages are more open and where plugging is not a problem. This prevents plugging of the more restricted recuperator passages, a problem which would certainly arise if only recuperators were employed to cool the high temperature waste gases exiting directly from the furnace. This two-stage cooling arrangement also safeguards the recuperator tubes against damaging exposure to extremely high temperature gases. Still another advantage of two-stage cooling with series-connected regenerators and recuperators is the greater waste gas temperature reductions which can be realized. This in turn permits more efficient down-stream gas cleaning devices to be employed. An example of one such gas cleaning device would be a bag house, which can only operate safely at gas temperature ranges below 450°F and above dew point.

Where bag houses are employed to clean waste gases, it is sometimes desirable to use a reverse or "pulse" air flow to flex the cloth bags and thereby remove entrapped particles. Past experience has indicated that the use of unheated ambient air for the pulse air flow may lower the temperature of the waste gases as well as the cloth bags and associated support surfaces to a point below the dew point. The resulting condensation will produce "caking" in the filter cloth which will inhibit proper gas cleaning. Also, acids may be formed if certain chemicals, such as for example sulphates, chlorine fluxes, fluorides or sulphides, are present in the waste gases.

In order to avoid these problems, it has heretofore been proposed to heat the pulse air flow by means of auxiliary heaters which are employed initially at start-up time to pre-heat the bag house, and continuously thereafter. This requires a sizable capital investment for the heating apparatus and its associated control system, as well as a continuing expenditure for operating power.

A further object of the present invention is to employ a portable auxiliary heating device for the pulse air flow which is employed only at start-up time to pre-heat the pulse air flow. Once the system is operating, a portion of the air being preheated by the recuperators is diverted and employed as the pulse air flow to the bag house, and the auxiliary heater is isolated and shut down. The auxiliary heater may then be taken to another location and used for other purposes, wherever heated air is required. The additional operating costs which would otherwise be required to continuously heat the pulse air are thus eliminated, at a considerable saving to the equipment operator.

These and other features, objects and advantages will become more apparent as the description proceeds with the aid of the accompanying Drawing, which is a somewhat diagrammatic illustration of an apparatus embodying the concepts of the present invention.

Referring now to the drawing, the apparatus 10 is shown positioned between a regenerative furnace 12 and a gas cleaning device 14, the latter in turn being connected to a chimney 16. The regenerative furnace 12 is of the conventional type having a furnace chamber 18 flanked on opposite sides 20a and 20b by primary checkers.

The apparauts 10 includes a regenerator 22 enclosing first and second chambers 24a and 24b. The first chamber 24a is connected by means of a first conduit 26a to one side 20a of the furnace. Likewise, the second chamber 24b is connected by means of a second conduit 26b to the other side 20b of the furnace.

The chambers 24a and 24b are in communication at their upper ends with a reversing valve means 28, the latter preferably being of the type described and claimed in U.S. Pat. No. 3,184,223. Valve means 28 includes a housing 30 containing a turtleback valve member 32 which is reciprocally driven in either a pneumatic, hydraulic or mechanical manner by means indicated generally at 33. The housing 30 is connected at its upper end as at 34 to a third conduit means 36 which leads to the gas cleaning device 14. The gas cleaning device is of conventional construction and is preferably although not necessarily of the type commonly referred to as a "bag house."

A recuperator 38 is positioned in the third conduit means 36 between the regenerator 22 and the gas cleaning device 14. The recuperator 38 may be conveniently provided with two banks of tubes 40a and 40b. The tubes 40a communicate at one end with a plenum chamber 42 which is in turn connected to a fan 44. The other ends of the tubes 40a communicate with another plenum chamber 46 which is also in communication with the tubes 40b. A third plenum chamber 48 connects the other ends of the tubes 40b to a fourth conduit means 50. Conduit means 50 leads from the recuperator 38 to an outlet 52 which is located within the housing 30 of the reversing valve means 28 at a point between the upper ends of the chambers 24a and 24b.

With the valve member 32 adjusted to the position shown by the solid lines in the drawing, the apparatus operates as follows: the flow of waste gases (diagrammatically indicated by the wavy arrows) flows from the furnace chamber 18 out through side 20a and then through the first conduit 26a into the first chamber 24a of the regenerator 22. It will of course be understood that the chambers 24a and 24b contain suitable brickwork which picks up heat from the waste gases and subsequently gives off heat by radiation to the combustion air. The flow of waste gas continues upwardly through chamber 24a into the housing 30 of reversing valve 28. The waste gases flow past the valve member 32 and into the third conduit 36. From here, the waste gases continue past the two banks of tubes 40b and 40a of the recuperator 38 and then on to the gas cleaning device 14. After passing through the gas cleaning device, the waste gases are exhausted through chimney 16. The flow of combustion air (diagrammatically indicated by the straight arrows) originates at the fan 44 which forces air from the surrounding atmosphere into the plenum chamber 42. From here, the flow of air proceeds through tubes 40a, plenum chamber 46, tubes 40b, plenum chamber 48 and then through the fourth conduit means 50 to the outlet 52. The valve member 32 then deflects the flow of combustion air downwardly into the second chamber 24b of the regenerator 22. From here, the flow of air continues through the second conduit 26b and furnace side 20b into the furnace chamber 18.

When the valve member is shifted to the opposite position indicated in dotted at 32a, the gas low through the underlying chambers 24a and 24b is reversed, i.e., the flow of combustion air from the fourth conduit 50 flows downwardly through chamber 24a and then on through the second contuit 26a to the furnace 12, while the waste gases flow from the furnace through conduit 26b and then upwardly through chamber 24b to the third conduit 26.

It will be understood that under normal operating conditions, the two-stage cooling action produced by the regenerator 22 and recuperator 38 will lower the waste gas temperature to a safe operating level for the gas cleaning device 14. However, to protect the gas cleaning device 14 against any damage that might be occasioned by an unusual and unexpected rise in the waste gas temperature, it may be desirable to provide a safety control valve 54 in the third conduit means 36 at a location downstream from the recuperator 38. The valve 54 will operate to admit ambient air into the conduit 36 in the event that the waste gas temperature should exceed a predetermined safe level. The valve 54 can also be employed to maintain the temperature of the exiting gases at a relatively constant temperature level, so that in turn the electrical resistivity of the particles entrained in the waste gases will also be relatively constant. This feature may be advantageous when the gas cleaning device 14 comprises an electrostatic precipitator.

The apparatus 10 also preferably includes a pulse air conduit 56 which leads from the gas cleaning device 14 to a fan 58. The fan 58 is connected by means of a conduit 60 to a portable auxiliary heater 62 which is preferably although not necessarily propane-fired. Another conduit 64 leads from the primary stage 40a of the recuperative heater 38 to conduit 60. Valves 66a and 66b are located respectively in conduits 60 and 64.

The above arrangement operates as follows: at start-up time, valve 66b is closed and valve 66a is open. The portable heater 62 is operated to heat ambient air which is pumped by fan 58 through conduit 56 to the gas cleaning device. Use of the heater 62 will continue until the gas cleaning device 14 is preheated to a satisfactory temperature level above dew point, and the waste gases reach an elevated temperature which is sufficient to prevent condensation. When this level of operation is reached, operation of heater 62 is discontinued, valve 66a is closed and valve 66b is opened. Thereafter, the pulse air flow is taken from the primary recuperator stage 40a, with the preheating being accomplished by means of energy derived from the waste gases exiting through the recuperative heater 38. The heater 62 may now be disconnected and taken to another location.

Having thus described a preferred embodiment of an apparatus embodying the concepts of the present invention, the advantages to be derived therefrom will now be better understood by those skilled in the art. Of particular importance is the arrangement in series of a regenerator 22 and a recuperator 38. This arrangement provides for a two-stage cooling of the waste gases to a temperature which is compatible with the safe operat- ing ranges of the more efficient gas cleaning devices. By the same token, the incoming combustion air is subjected to a two-stage heating, first in the recuperator 38 by convection, and finally in the regenerator 22 by radiation, with the result that higher temperatures are obtainable. This in turn improves combustion efficiency in the furnace 12 with the result that fuel imput to the furnace can be reduced, thereby reducing the quantity of waste gases being discharged to the atmosphere. Preheating the pulse air flow to the gas cleaning device by means of the recuperator 38 avoids the necessity of employing auxiliary heating means, and this in turn makes possible significant savings in both initial capital expenditures as well as continuing operating costs.

It is my intention to cover all changes and modifications of the embodiment herein chosen for purposes of disclosure which do not depart from the spirit and scope of the invention.

I claim:

1. For use with a regenerative furnace, an apparatus for employing waste gases being discharged from the furnace to heat combustion air being introduced into the furnace, said apparatus comprising: a regenerator having first and second chambers, said chambers being connected respectively by first and second conduit means to opposite sides of the furnace; reversing valve means communicating with said first and second chambers and with third and fourth conduit means, said third conduit means leading from said reversing valve means to a gas cleaning device, the latter device in turn being connected to a chimney; a recuperator in said third conduit means between said reversing valve means and said gas cleaning device, the recuperator being connected to said reversing valve means by said fourth conduit means; means for supplying combustion air to said recuperator, from whence the combustion air is directed through said fourth conduit means to said reversing valve means; and, means for adjusting said reversing valve means between one position permitting waste gases to escape from the furnace through said first conduit means and said first chamber to said third conduit means while permitting combustion air to flow from said fourth conduit means to the furnace through said second chamber and said second conduit means, and another position permitting waste gases to escape from he furnace through said second conduit means and said second chamber to said third conduit means while permitting combustion air to flow from said fourth conduit means to the furnace through said first chamber and said first conduit means.

2. The apparatus as claimed in claim 1 wherein said gas cleaning device is a bag house.

3. The apparatus as claimed in claim 1 further characterized by means in said third conduit means between said recuperative heater and said gas cleaning device for admitting ambient air into said third conduit means in order to control the temperature of the gases flowing to said gas cleaning device.

4. The apparatus as claimed in claim 1 further characterized by a fifth conduit means for supplying a reverse "pulse" flow of heated air from said recuperator to said gas cleaning device.

5. The apparatus as claimed in claim 4 further characterized by auxiliary heater means for supplying heated ambient air to said fifth conduit means, and valve means for alternately connecting either said recuperator or said auxiliary heater means to said fifth conduit means.

6. For use with a regenerative furnace wherein the waste gases are conveyed by conduit means to a gas cleaning device, the improvement comprising regenerative and recuperative heaters connected in series by said conduit means, said heaters being operative to cool the waste gases emitted by the furnace in two stages, while providing a two-stage heating effect for combustion air being admitted into the furnace.

* * * * *

UNITED STATES PATENT OFFICE
CERTIFICATE OF CORRECTION

Patent No. 3,764,259          Dated October 9, 1973

Inventor(s)    Frank A. Alexander, Jr.

It is certified that error appears in the above-identified patent and that said Letters Patent are hereby corrected as shown below:

Col. 3, line 10, delete "apparauts" and insert therefor --apparatus--
Col. 4, line 11, delete "contuit" and insert therefor --conduit--;

Col. 5, line 30, delete "latter" and insert therefor --said--;
Col. 6, line 16, delete "recuperative heater" and insert therefor --recuperator--;
Col. 6, line 34, delete "heaters" and insert therefor --heat exchangers--;
Col. 6, line 35, delete "heaters" and insert therefor --heat exchangers--.

Signed and sealed this 6th day of August 1974.

(SEAL)
Attest:

McCOY M. GIBSON, JR.          C. MARSHALL DANN
Attesting Officer             Commissioner of Patents